US007853251B2

(12) United States Patent
Sehedic et al.

(10) Patent No.: US 7,853,251 B2
(45) Date of Patent: Dec. 14, 2010

(54) METHOD AND APPARATUS FOR CONTROLLING THE TRANSMISSION OF RADIO LINKS IN A RADIO-COMMUNICATION SYSTEM

(75) Inventors: Yann Sehedic, Vanves (FR); Laurent Vallette, Les Clayes Sous Bois (FR)

(73) Assignee: Alcatel Lucent, Paris (FR)

( * ) Notice: Subject to any disclaimer, the term of this patent is extended or adjusted under 35 U.S.C. 154(b) by 477 days.

(21) Appl. No.: 11/815,497

(22) PCT Filed: Feb. 2, 2006

(86) PCT No.: PCT/EP2006/000910

§ 371 (c)(1),
(2), (4) Date: Sep. 21, 2007

(87) PCT Pub. No.: WO2006/084625

PCT Pub. Date: Aug. 17, 2006

(65) Prior Publication Data

US 2008/0214177 A1 Sep. 4, 2008

(30) Foreign Application Priority Data

Feb. 8, 2005  (EP) ................................. 05290278

(51) Int. Cl.
*H04Q 7/20* (2006.01)
(52) U.S. Cl. ................. 455/422.1; 455/502; 455/426.1; 455/450
(58) Field of Classification Search ............. 455/422.1, 455/502, 426.1, 517, 562.1, 59, 434, 452.1, 455/515, 509, 62, 446, 450; 370/335, 342, 370/350, 352, 389
See application file for complete search history.

(56) References Cited

U.S. PATENT DOCUMENTS 5,963,868 A * 10/1999 Baek .......................... 455/503
7,142,828 B2 * 11/2006 Dartois ....................... 455/101
7,149,547 B2 * 12/2006 Katz et al. ................ 455/562.1

FOREIGN PATENT DOCUMENTS

GB          2 376 601 A    12/2002
WO      WO 03/065615 A    8/2003

OTHER PUBLICATIONS

"Universal Mobile Telecommunications System (UMTS); Synchronisation in UTRAN Stage 2 (3GPP TS 25.402 version 6.1.0 Release 6); ETSI TS 125 402" Dec. 2004, ETSI Standards, European Telecommunications Standards Institute, Sophia-Antipo, France XP014027677.

* cited by examiner

*Primary Examiner*—John Lee
(74) *Attorney, Agent, or Firm*—Fay Sharpe LLP

(57) ABSTRACT

A method for controlling the transmission timing of a radio link on an air interface between a radio terminal and a radio access node, in a radio access node adapted to transmit a plurality of radio links to a radio terminal with substantially simultaneous transmission timings, is disclosed. It is determined whether predetermined conditions are met so that a substantially simultaneous transmission of a first and second radio links to said radio terminal can be selected. Responsive to this determination, a substantially simultaneous transmission of the first and second radio links is selected.

20 Claims, 7 Drawing Sheets

METHOD AND APPARATUS FOR CONTROLLING THE TRANSMISSION OF RADIO LINKS IN A RADIO-COMMUNICATION SYSTEM

The present invention relates to techniques for controlling the transmission on a radio link in radio-communication systems and in particular to the control of transmission timings on a radio link.

TECHNICAL BACKGROUND

A particular application of the invention is in the control of transmission timings in base stations in UMTS (Universal Mobile Telecommunication System) type third generation cellular networks standardized by the organization 3GPP (3rd Generation Partnership Project). The invention is described hereinafter in its application to a UMTS network in Frequency Division Duplex (FDD) mode, and FIG. 1 shows the architecture of such a network.

The mobile service switches 10, belonging to a Core Network (CN), are linked to one or more fixed networks 11 and, by means of an interface called Iu, to control units 12, or RNCs (Radio Network Controllers). Each RNC 12 is linked to one or more radio stations 13 by means of an interface called Iub. The radio stations 13, distributed over the network coverage area, can communicate by radio with mobile terminals 14, 14a and 14b, called UEs (User Equipment). The radio stations can be grouped together to form nodes called "Nodes B". Some RNCs 12 can additionally communicate with each other by means of an interface called Iur. The RNCs and the radio stations form an access network called UTRAN (UMTS Terrestrial Radio Access Network). The UTRAN includes elements from layers 1 and 2 of the ISO model with a view to providing the links required on the radio interface (called Uu), and a Radio Resource Control (RRC) stage 15A belonging to layer 3, as described in the technical specification 3β TS 25.301, "Radio Interface Protocol Architecture", version 4.2.0 published in December 2001 by the 3GPP. Viewed from the upper layers, the UTRAN acts simply as a relay between the UE and the CN.

FIG. 2 shows the RRC stages 15A, 15B and the stages of the lower layers that belong to the UTRAN and to a US. On each side, layer 2 is subdivided into a Radio Link Control (RLC) stage 16A, 16B and a Medium Access Control (MAC) stage 17A, 17B. Layer 1 includes a coding and multiplexing stage 18A, 18B. A radio stage 19A, 19B provides for the transmission of radio signals based on symbol trains supplied by stage 18A, 18B, and provides for the reception of signals in the other direction.

There are various ways of adapting the protocol architecture according to FIG. 2 to the UTRAN hardware architecture according to FIG. 1, and in general various structures can be adopted according to the channel types (see section 11.2 of the technical specification 3β TS 25.401, "UTRAN Overall Description", version 4.2.0 published in September 2001 by the 3GPP). The RRC, RLC and MAC stages are in the RNC 12. Layer 1 is for example in the Node B. Part of this layer may however be in the RNC 12.

Layers 1 and 2 are each controlled by the RRC sub-layer, the characteristics of which are described in the technical specification 3β TS 25.331, "RRC Protocol Specification", version 4.1.0 published in June 2001 by the 3GPP. The RRC stage 15A, 15B supervises the radio interface. It additionally handles flows to be transmitted to the remote station according to a "control plane", as opposed to the "user plane" which corresponds to the handling of user data coming from layer 3.

UMTS in FDD mode supports a macrodiversity technique which involves anticipating that a UE can communicate simultaneously with separate radio stations in a so-called "Active Set" such that, in the downlink direction, the UE receives the same information several times and that, in the uplink (UL) direction, the radio signal transmitted by the UE is picked up by the radio station to form various estimations which are then combined in the UTRAN.

Macrodiversity results in a receive gain which improves the performance of the system owing to the combination of different observations of the same item of information. It also enables Soft Handovers (SHOs) to be achieved as the UE moves.

In macrodiversity, branching of transport channels for multiple transmission from the UTRAN or the UE and the combination of these transport channels in receive mode are operations for which a selection and combination module belonging to layer 1 is responsible. This module is at the interface with the MAC sub-layer, and it is located in the RNC serving the UE. If the radio stations involved depend on different RNCs communicating over the Iur interface, one of these RNCs acts as SRNC and the other as DRNC.

When several RNCs are involved in a communication with a UE, there is generally one Serving RNC (SRNC), in which the layer-2-based modules (RLC and MAC) are located, and at least one Drift RNC (DRNC) to which a radio station is linked, and with which radio station the UE is in radio communication. Suitable protocols provide the exchanges between these RNCs over the Iur interface, for example ATM (Asynchronous Transfer Mode) and AAL2 (ATM Adaptation Layer No. 2).

These same protocols can also be employed on the Sub interface for exchanges between a Node B and its RNC. Above the ATM and AAL2 layers, a Frame Protocol (FP) is used in the user plane to enable the SRNC to communicate with the Node B or Nodes B involved in a communication with a given UE.

This FP protocol is described in the technical specifications 3β TS 25.427, "UTRAN Iub/Iur Interface User Plane Protocol for DCH Data Streams", and 3β TS 25.435, "UTRAN Tub Interface User Plane Protocols for Common Transport Channel Data Streams", versions 4.3.0, published in December 2001 by the 3GPP. In particular, it provides signalling frames allowing transport channels to be synchronized in the manner described in section 7 of the technical specification 3β TS 25.402, "Synchronization in UTRAN Stage 2", version 4.3.0, published in December 2001 by the 3GPP.

The objective of this transport channel synchronization is to obtain a layer 2 common frame numbering between the UTRAN and the UE, achieved using an 8-bit Connection Frame Number (CFN), managed by layer 2 for each Transport Block Set (TBS) exchanged with the UE by incrementing it by one unit every 10 ms.

This CFN is not transmitted over the air interface, but it is added to the frames exchanged over the Iub interface. The physical layer maps it to a frame numbering kept up-to-date for each cell, defined by a System Frame Number (SFN) coded on 12 bits. The Node B increments this SFN at each new 10 ms radio frame and broadcasts it over the common control channels of the cell.

For a given TBS and a given cell, the offset between the CFN and the SFN is determined before the radio link between the Node B and the UE concerned is set up, in terms of an offset expressed by an integer number of frames (Frame Offset).

When a UE is not in soft handover, the cell included in its active set is considered as a so-called "reference cell". The cell, which is selected as a reference cell, remains as a reference cell even if other cells are added to the active set.

UMTS is a radio communication system using Code-Division Multiple Access (CDMA), that is to say the symbols transmitted are multiplied by spreading codes consisting of samples known as "chips" whose rate (3.84 Mchip/s in the case of UMTS) is greater than that of the symbols transmitted. The spreading codes distinguish between various physical channels PhCH which are superimposed on the same transmission resource constituted by carrier frequency. The auto- and cross-correlation properties of the spreading codes enable the receiver to separate the PhCHs and to extract the symbols intended for it. For UMTS in FDD mode on the downlink (DL), a scrambling code is allocated to each base station, and various physical channels used by this base station are distinguished by mutually orthogonal "channelization" codes. For each PhCH, the global spreading code is the product of the "channelization" code and the scrambling code of the base station. The spreading factor (equal to the ratio of the chip rate to the symbol rate) is a power of 2 lying between 4 and 512. This factor is chosen as a function of the bit rate of the symbols to be transmitted on the PhCH.

The various physical channels obey a specific frame structure in the FDD mode, and 10 ms frames follow one another on the carrier frequency used by the base station. Each frame is subdivided into N=15 time slots of 666 μs. Each slot can carry the superimposed contributions of one or more physical channels, comprising common channels and dedicated channels DPCH ("Dedicated Physical CHannel"). The downlink DPCH can be seen as amalgamating a physical channel dedicated to control, or DPCCH ("Dedicated Physical Control CHannel"), and a physical channel dedicated to the data, or DPDCH ("Dedicated Physical Data CHannel").

For the purpose of synchronizing its transmission timings, a UE chooses a reference radio link (RL), i.e. the first detected path (in time) of the corresponding downlink DPCCH/DPDCH frame from its reference cell. The uplink DPCCH/DPDCH frame transmission takes place approximately $T_0$ chips after the reception of the reference RL (for an example value for $T_0$, see section 7.6.3 "Uplink/downlink timing at UE" of the technical specification 3GPP 25.211, "Physical channels and mapping of transport channels onto physical channels (FDD) (Release 6)", v 6.3.0, published in December 2004 by the 3GPP, which mentions that $T_0$ is a constant defined to be 1024 chips). That is, the reference point for the UE initial transmit timing control is the reception time of the reference RL plus $T_0$ chips. As the reception timing of this reference RL may drift over time, the UE has the capability to monitor and compensate for such a drift. However, this is a slow process as the UE should be capable of changing its transmission timing according to the received downlink DPCCH/DPDCH frame with a maximum adjustment rate of ¼ chip per 200 ms (see section 7.1 "UE Transmit Timing" of the technical specification 3GPP TS 25.133, "Technical Specification Group Radio Access Network; Requirements for support of radio resource management (FDD) (Release 6)", v 6.8.0, published in December 2004 by the 3GPP).

In a mobility situation, should the reference RL be removed from the Active Set, the UE simply selects another reference RL in the Active Set.

A first scenario illustrating a problematic case arising from UE movements is exposed hereinafter:

A first radio link $RL_1$ is established on a first, reference cell $Cell_1$ controlled by a first base station Node-$B_1$. The first slope on FIG. 3 indicates that the UE is moving away from the base station Node-$B_1$ and thus the propagation delay on the $RL_1$ increases. As explained above, the UE ensures that the uplink DPCH Transmission time is as close as possible to $T_0$=1024 chips after the reception of the downlink DPCH from the cell $Cell_1$. As mentioned above, this is done by small adjustments (no more than ¼ chips every 200 ms). At instant referenced $t_3$ on FIG. 3, a second RL ($RL_2$) is then added on a second cell $Cell_2$ controlled by a second base station Node-$B_2$. It is assumed that the measurements provided by the UE (based on observed time difference between its own timing and the second cell ($Cell_2$) timing—see the definition of synchronization parameters "OFF" and "Tm" in Chapter 5, "Synchronisation Counters and Parameters" of the technical specification 3GPP TS 25.402, "Technical Specification Group Radio Access Network; Synchronisation in UTRAN Stage 2 (Release 6)", v. 6.1.0, published in December 2004 by the 3GPP) are such that after rounding of the Frame Offset+Chip Offset parameters values provided to the second base station (Node-$B_2$), the downlink DPDCH/DPCCH from the second cell $Cell_2$, i.e. corresponding to the second radio link ($RL_2$) is received at $T_0+\alpha_{cell2}$ ($t_3$) where $\alpha_{cell2}$ is between −148 and +148 chips. In this example, by rounding the Chip Offset to the nearest 256 chips-boundary, the transmission timing for $RL_2$ is such that it is received at e.g. $T_0+\alpha_{cell2}$ ($t_3$)=$T_0$+125 chips.

The second slope indicates that the UE is moving closer to the second base station Node-$B_2$ and thus the propagation delay on the $RL_2$ decreases. As the UE continues to move away from the first base station Node-$B_1$, the propagation delay on the $RL_1$ continues to increase and the UE continues to shift the UL DPCH Transmission time to ensure that it is as close as possible to 1024 chips after the reception of the downlink DPDCH/DPCCH from the first cell $Cell_1$ ($Cell_1$ is still its reference cell). As the UE continues to move closer to the second base station Node-$B_2$, the propagation delay on the $RL_2$ continues to decrease. This, added to the shifting of the UL DPCH Transmission time, means that the Reception instant of the DL DPCH from the second cell $Cell_2$ is moving away from the UL DPCH Transmission time, i.e. $T_0+\alpha_{cell2}$ is increasing. Then, at instant referenced $t_5$ on FIG. 3, a third radio link $RL_3$ on a third cell $Cell_3$ controlled by the second base station Node-$B_2$ is added to the Active Set. At this point in time, $T_0+\alpha_{cell2}$ ($t_5$)=$T_0$+132 chips for the second radio link $RL_2$. Based on measurement provided by the UE on observed time difference between its own timing and the third cell $Cell_3$ timing, the SRNC will provide timing instructions to the second base station Node-$B_2$ which will result according to mechanisms specified in 3GPP TS 25.402 in a third radio link $RL_3$ on which the transmission occurs 256 chips later than on the second radio link $RL_2$: $T_0+\alpha_3$ ($t_5$)=$T_0$−124 chips. Therefore, this will create a situation in which two radio links ($RL_2$ and $RL_3$) transmitted by the same base station Node-$B_2$ will be non simultaneous, since they will be transmitted approximately 256 chips apart.

A second scenario illustrating a problematic case arising from a change of reference cell for a UE is exposed hereinafter:

This scenario is illustrated by FIGS. 4-9 which shows the evolution (with time) of the DL DPCH reception time and UL DPCH transmission time, and FIG. 10 which shows message flows between a network controller (SRNC), its controlled base stations (Node-$B_1$, Node-$B_2$, Node-$B_3$) and a UE.

First step (FIG. 4): A first radio link ($RL_1$) is established on a reference cell ($Cell_1$) controlled by a first base station (Node-$B_1$). The reference cell ($Cell_1$) provides a reference for the determination by the UE of the frame timing of the uplink DPCH transmission (see section 7.1.2 of the technical specification 3GPP TS 25.133). As illustrated on FIG. 4, a 148 chips window is defined around instant $T_0$ such that UTRAN starts the transmission of the downlink DPCCH/DPDCH for each new radio link at a frame timing such that the frame timing received at the UE will be within $T_0+/-148$ chips prior to the frame timing of the uplink DPCCH/DPDCH at the UE (see section 4.3.2.4, "Synchronisation procedure B" of the technical specification 3GPP TS 25.214

On FIG. 10, this first step is illustrated by the radio link setup request (RL-SETUP-REQ) and response (RL-SETUP-RESP) NBAP messages exchanged between the first base station (Node-$B_1$) and its serving controller (SRNC) for the establishment of the first radio link ($RL_1$). FIG. 10 also shows the RRC messages exchanged between the SRNC and the UE for the purpose of establishing an RRC connection for the UE (RRC CONNECTION SETUP) and the corresponding confirm from the UE that an RRC connection is established (RRC CONNECTION COMPLETE).

Second step (FIG. 5): A second radio link ($RL_2$) is established on a second cell ($Cell_2$) controlled by a second base station (Node-$B_2$). The reference cell ($Cell_1$) still provides a reference for the determination by the UE of the frame timing of the uplink DPCH transmission. It is assumed that the measurements provided by the UE (based on observed time difference between its own timing and the second cell ($Cell_2$) timing—see the definition of synchronization parameters "OFF" and "Tm" in Chapter 5, "Synchronisation Counters and Parameters" of the technical specification 3GPP TS 25.402) are such that after rounding of the Frame Offset+Chip Offset parameters values provided to the second base station (Node-$B_2$), the second radio link ($RL_2$) is received at: $T_0+\alpha_{cell2}(t_{step2})=T_0+125$ chips before the UL DPCH frame timing at the UE, that is close to the upper bound of the receiving window ($T_0+/-148$ chips).

On FIG. 10, this second step is illustrated by the radio link setup request (RL-SETUP-REQ) and response (RL-SETUP-RESP) NBAP messages exchanged between the second base station (Node-$B_2$) and its serving controller (SRNC) for the establishment of the second radio link ($RL_2$). FIG. 10 also shows the RRC messages exchanged between the SRNC and the UE for the purpose of adding the second radio link ($RL_2$) in the active set of the UE (ACTIVE SET UPDATE) and the corresponding confirm from the UE that the active set update is completed (ACTIVE SET UPDATE COMPLETED).

Third step (FIG. 6): The first radio link ($RL_1$), established on the reference cell, is removed from the Active Set. The UE then starts adjusting its transmit timing and chooses in an implementation-specific manner the new reference cell for determination of the UL DPCH frame timing at the UE. In this particular case, as there is only one radio link, the second radio link ($RL_2$), in the Active Set, the UE chooses the second cell ($Cell_2$) as its new reference cell.

The UE then starts to adjust the UL DPCH frame timing so that it the UL DPCH transmission time is as close as possible to 1024 chips after the reception of the DL DPCH from the second cell ($Cell_2$) (new reference cell). This can be done only by small adjustments (no more than ¼ chips every 200 ms). Thus, $T_0+\alpha_{cell2}(t)$ starts to progressively decrease with time.

On FIG. 6, the dashed lines indicate the position the uplink transmit instant and the receive window in the UE at $t_{step2}$ (second step), and the plain lines illustrate the positions at $t_3$ (third step).

In this example, $T_0+\alpha_{cell2}(t_{step3})=T_0+105$ chips before the UL DPCH frame timing at the UE.

On FIG. 10, this third step is illustrated by the radio link deletion request (RL-DELETION-REQ) and response (RL-DELETION-RESP) NBAP messages exchanged between the first base station (Node-$B_1$) and its serving controller (SRNC) for the deletion of the first radio link ($RL_1$). FIG. 10 also shows the RRC messages exchanged between the SRNC and the UE for the purpose of deleting the first radio link ($RL_1$) in the active set of the UE (ACTIVE SET UPDATE) and the corresponding confirm from the UE that the active set update is completed (ACTIVE SET UPDATE COMPLETED).

Fourth step (FIG. 7): A third radio link ($RL_3$) is established on a third cell ($Cell_3$) controlled by a third base station (Node-$B_3$). It is assumed that the measurements provided by the UE (based on observed time difference between its own timing and the third cell ($Cell_2$) timing—see the definition of synchronization parameters "OFF" and "Tm" in Chapter 5, "Synchronisation Counters and Parameters" of the technical specification 3GPP TS 25.402) are such that after rounding of the Frame Offset+Chip Offset parameters values provided to the second base station (Node-$B_3$), the third radio link ($RL_3$) is received at: $T_0+\alpha_{cell3}(t_{step4})=T_0-115$ chips before the UL DPCH frame timing at the UE, that is close to the lower bound of the receiving window ($T_0+/-148$ chips). Furthermore, as the UE continued adjusting the UL DPCH frame timing so that the UL DPCH transmission time is as close as possible to 1024 chips after the reception of the DL DPCH from its new reference cell ($Cell_2$), $T_0+\alpha_{cell2}(t)$ has further decreased and is assumed to have reached the value (on FIG. 7): $T_0+\alpha_{cell2}(t_{step4})=T_0+85$ chips before the UL DPCH frame timing at the UE.

On FIG. 7, the dashed lines indicate the position of the uplink transmit instant and the receive window in the UE at $t_{step2}$ (second step), the plain lines indicate the positions at $t_{step4}$ (fourth step).

On FIG. 10, this fourth step is illustrated by the radio link setup request (RL-SETUP-REQ) and response (RL-SETUP-RESP) NBAP messages exchanged between the third base station (Node-$B_3$) and its serving controller (SRNC) for the establishment of the third radio link ($RL_3$). FIG. 10 also shows the RRC messages exchanged between the SRNC and the UE for the purpose of adding the third radio link ($RL_3$) in the active set of the UE (ACTIVE SET UPDATE) and the corresponding confirm from the UE that the active set update is completed (ACTIVE SET UPDATE COMPLETED).

Fifth step (FIG. 8): The UE keeps adjusting the UL DPCH frame timing so that the UL DPCH transmission time is as close as possible to 1024 chips after the reception of the DL DPCH from its new reference cell ($Cell_2$). $T_0+\alpha_{cell2}(t)$ has further decreased and is assumed to have reached the value (on FIG. 8): $T_0+\alpha_{cell2}(t_{step5})=T_0+75$ chips before the UL DPCH frame timing at the UE. In the same manner, since $T_0$ has moved by 10 chips towards the reception instant of the DL DPCH from its new reference cell ($Cell_2$), $T_0+\alpha_{cell3}(t)$ has decreased and is now assumed to have reached the value (on FIG. 8): $T_0+\alpha_{cell3}(t_{step5})=T_0-125$ chips before the UL DPCH frame timing at the UE.

On FIG. 8, the dashed lines indicate the position of the uplink transmit instant and the receive window in the UE at $t_{step2}$ (second step), the plain lines indicate the positions at $t_{step5}$ (fifth step).

Sixth step (FIG. 9): A fourth radio link ($RL_4$) is established on a fourth cell ($Cell_3$) controlled by the third base station (Node-$B_3$). It is assumed that the measurements provided by the UE (based on observed time difference between its own timing and the fourth cell ($Cell_4$) timing—see the definition of synchronization parameters "OFF" and "Tm" in Chapter 5, "Synchronisation Counters and Parameters" of the technical specification 3GPP TS 25.402) are such that after rounding of the Frame Offset+Chip Offset parameters values provided to the third base station (Node-$B_3$), the fourth radio link ($RL_4$) is received at: $T_0+\alpha_{cell4}(t_{step6})=T_0+121$ chips before the UL DPCH frame timing at the UE, that is close to the upper bound of the receiving window ($T_0+/-148$ chips).

The UE keeps adjusting the UL DPCH frame timing so that the UL DPCH transmission time is as close as possible to 1024 chips after the reception of the DL DPCH from its new reference cell ($Cell_2$). $T_0+\alpha_{cell2}(t)$ has further decreased and is assumed to have reached the value (on FIG. 9): $T_0+\alpha_{cell2}(t_{step6})=T_0+65$ chips before the UL DPCH frame timing at the UE. In the same manner, since $T_0$ has moved by 10 chips towards the reception instant of the DL DPCH from its new reference cell ($Cell_2$), $T_0+\alpha_{cell3}(t)$ has decreased and is now assumed to have reached the value (on FIG. 9): $T_0+\alpha_{cell3}(t_{step6})=T_0-135$ chips before the UL DPCH frame timing at the UE, that is very close to the lower bound of the receiving window.

On FIG. 10, this sixth step is illustrated by the radio link setup request (RL-ADDITION-REQ) and response (RL-ADDITION-RESP) NBAP messages exchanged between the third base station (Node-$B_3$) and its serving controller (SRNC) for the addition of the fourth radio link ($RL_4$) in the active set. FIG. 10 also shows the RRC messages exchanged between the SRNC and the UE for the purpose of adding the fourth radio link ($RL_4$) in the active set of the UE (ACTIVE SET UPDATE) and the corresponding confirm from the UE that the active set update is completed (ACTIVE SET UPDATE COMPLETED).

This sixth step results in a situation in which two radio links, the third ($RL_3$) and fourth ($RL_4$) ones, should be transmitted with timings that are distant from a multiple of 256 chips. Both radio links are transmitted by the same base station (Node-$B_3$).

However, some base station products feature the advantageous capability to perform substantially simultaneous transmission of radio links, for the purpose of optimized performances, efficiency, in particular with regard to power consumption and radio resource management, which leads to lower cost.

The two above-described scenarios provide examples where the transmission timings as currently specified by the 3GPP organization for UMTS FDD system does not allow the use of such an optimum capability.

SUMMARY OF THE INVENTION

An object of the present invention is to limit the potential sub-optimal transmission schemes arising from the above-mentioned scenarios, by providing an enhanced process by which a base station may always have the opportunity to select a substantially simultaneous transmission of radio links whenever possible.

The present invention aims to leverage the advantageous capability of some base stations to transmit different radio in a substantially simultaneous manner, that is, with substantially simultaneous effective timings. It is therefore proposed that a base station with this type of capability may select a substantially simultaneous transmission of radio links whenever possible.

In systems where the base station controllers determine and forward transmission timing information to supervised base stations, such base station controller may be designed so that they only submit transmission timings for new or additional radio links that would result in substantially simultaneous transmission of radio links to those among their supervised base stations with said capabilities.

Alternatively, base stations with said capabilities may, upon reception from a controller of transmission timings for new or additional radio links that would not result in substantially simultaneous transmission, modify said transmission timings so that they are substantially simultaneous, and inform the controller of said modified transmission timings.

According to the main embodiment of the invention, a base station with substantially simultaneous transmission capabilities selects such substantially simultaneous transmission. More specifically, one aspect of the invention consists in allowing a base station with substantially simultaneous transmission capabilities to perform a radio link adjustment at the time of the establishment of a new radio link in softer handover, so that substantially simultaneous transmission may be used, including for the new radio link in softer handover.

The UE is then informed of such selection. The resulting transmission timings for any new radio link can therefore be determined at the UE side, or expressly be communicated to the UE.

According to one broad aspect, the invention provides a method for controlling the transmission timing of a radio link on an air interface between a radio terminal and a radio access node, in a radio access node adapted to transmit a plurality of radio links to a radio terminal with substantially simultaneous transmission timings. The method comprises the steps of determining whether predetermined conditions are met so that a substantially simultaneous transmission of a first and second radio links to said radio terminal can be selected, and, responsive to said determination, selecting a substantially simultaneous transmission of said first and second radio links.

In some embodiments, the method further comprises the step of informing the radio terminal that the transmission of said first and second radio links will be substantially simultaneous.

In some embodiments, the method further comprises the step of informing a radio access node controller that substantially simultaneous transmission of said first and second radio links is selected.

In some embodiments, the method further comprises the step, in a wireless cellular radio access node which serves a plurality of radio cells, of determining whether said first radio link is being transmitted to the radio terminal in a first cell with a first transmission timing, and whether establishment of said second radio link for transmission to the radio terminal in the first cell has been requested.

In some embodiments, the method further comprises the step, in a wireless cellular radio access node which serves a plurality of radio cells, of determining whether said first and second radio links are in the process of being established for transmission to the radio terminal in a first cell and second cell, respectively.

In some embodiments, the method further comprises the step, in a radio access node which is transmitting the first radio link to the radio terminal, said first radio link being transmitted with a first transmission timing, of selecting a transmission timing for the second radio link so that the transmission of said first and second radio links is substantially simultaneous.

In some embodiments, the method further comprises the step of communicating to the terminal said selected transmission timing information.

In some embodiments, the method further comprises the steps of, in a radio access node controller, communicating to the radio access node transmission timing information for the second radio link, and receiving from the radio access node information that a substantially simultaneous transmission of said first and second radio links is selected.

In some embodiments, the method further comprises the step of transmitting to the radio terminal said information that a substantially simultaneous transmission of said first and second radio links is selected.

In some embodiments, said information that a substantially simultaneous transmission of said first and second radio links is selected comprises transmission timing information for said second radio link.

In some embodiments, the method further comprises the step of transmitting to the radio terminal said timing information for said second radio link received from the radio access node.

Another broad aspect provides a radio access node adapted to implement the above-mentioned methods.

Another broad aspect provides a radio access node controller adapted to implement the above-mentioned methods.

The invention may be implemented in any radio access node, such as a base station, for instance in a UMTS, GSM, GPRS, CDMA or TDMA system, a radio head in a distributed base station, or a radio access point, for instance in a MESH, Ad-hoc, WiFi or WiMAX radio network. Likewise, the invention may be implemented in any radio access node controller, such as a controller of the above-mentioned radio access node examples.

Another broad aspect provides a computer readable medium having processor executable instructions thereon for implementation by a processor, the instructions executing the above-mentioned methods.

DESCRIPTION OF THE PREFERRED EMBODIMENTS

The present invention will be described with reference to certain embodiments and with reference to certain drawings but the present invention is not limited thereto but only by the claims. The drawings are schematic and non-limiting.

The following details the preferred, although non limitative, embodiment of the invention in a UMTS system. In particular, although the invention is directed to a radio access node and a radio access node controller, the following describes the invention as implemented in a UMTS base station (Node-B), and Radio Network Controller (RNC), respectively.

Figure 1:
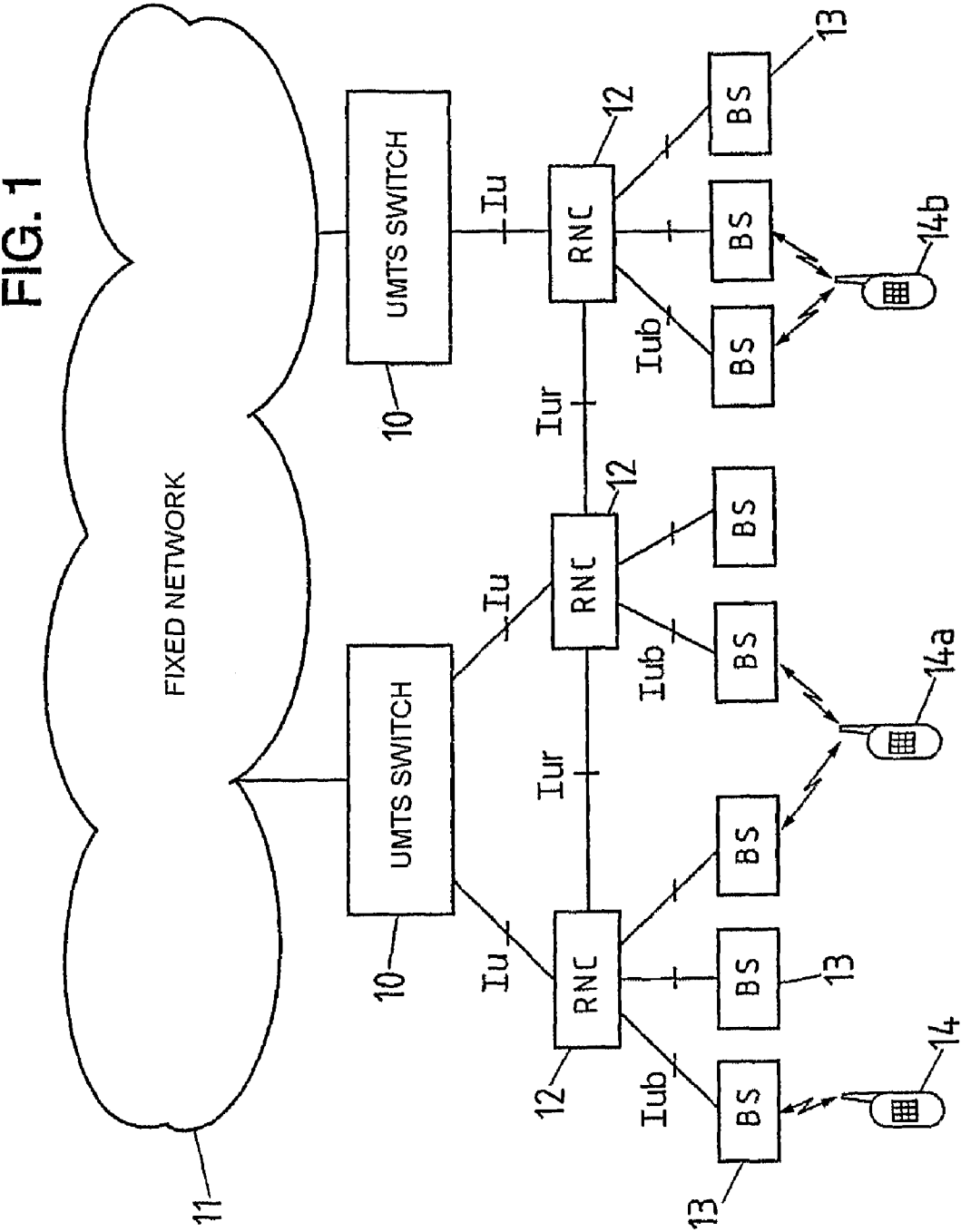
FIG. 1, already referred to, is a schematic diagram of the architecture of a UMTS system.
Figure 2:
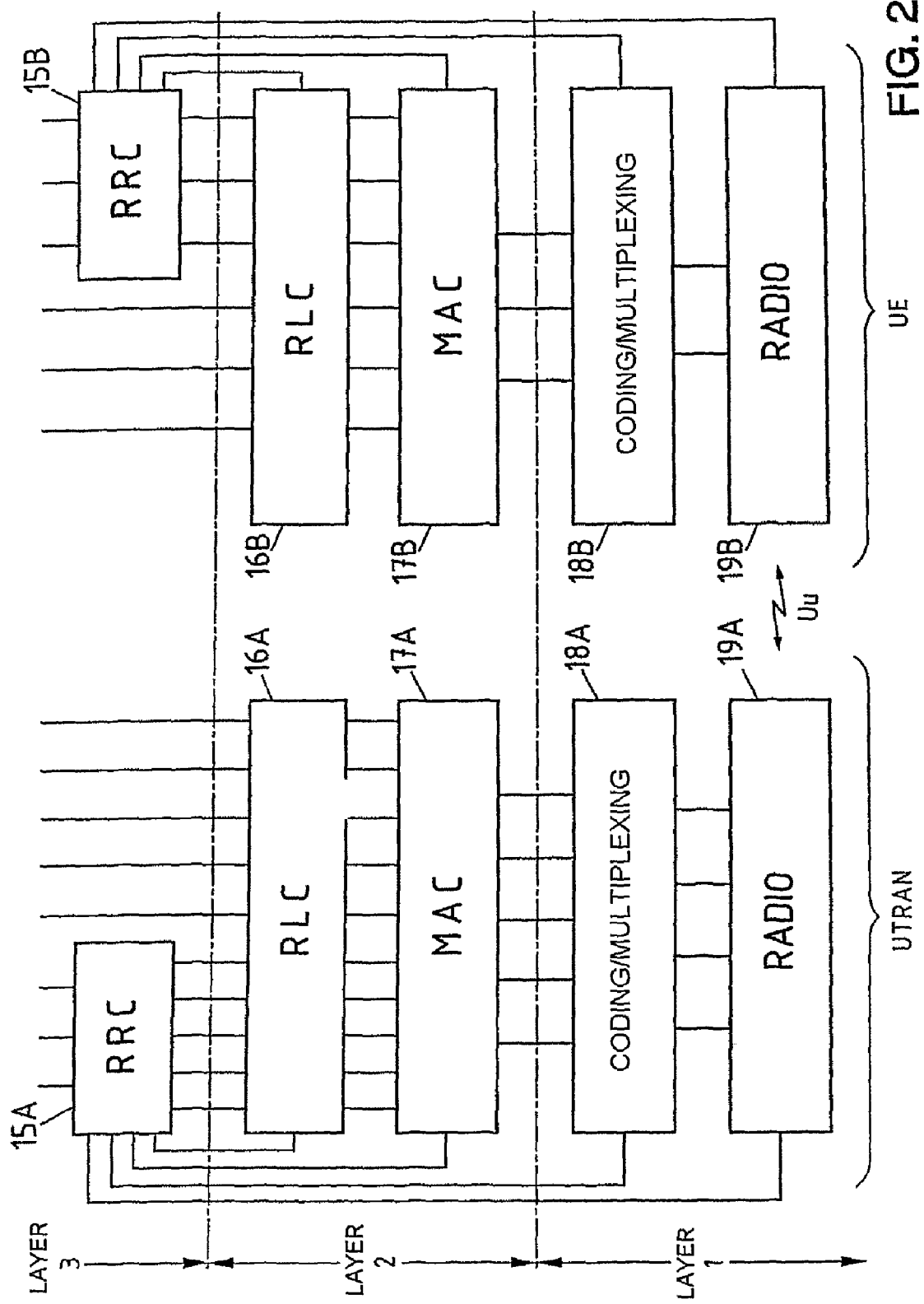
FIG. 2, already referred to, is a schematic diagram representing the protocol layers that are common to the UTRAN and the UE.
Figure 3:
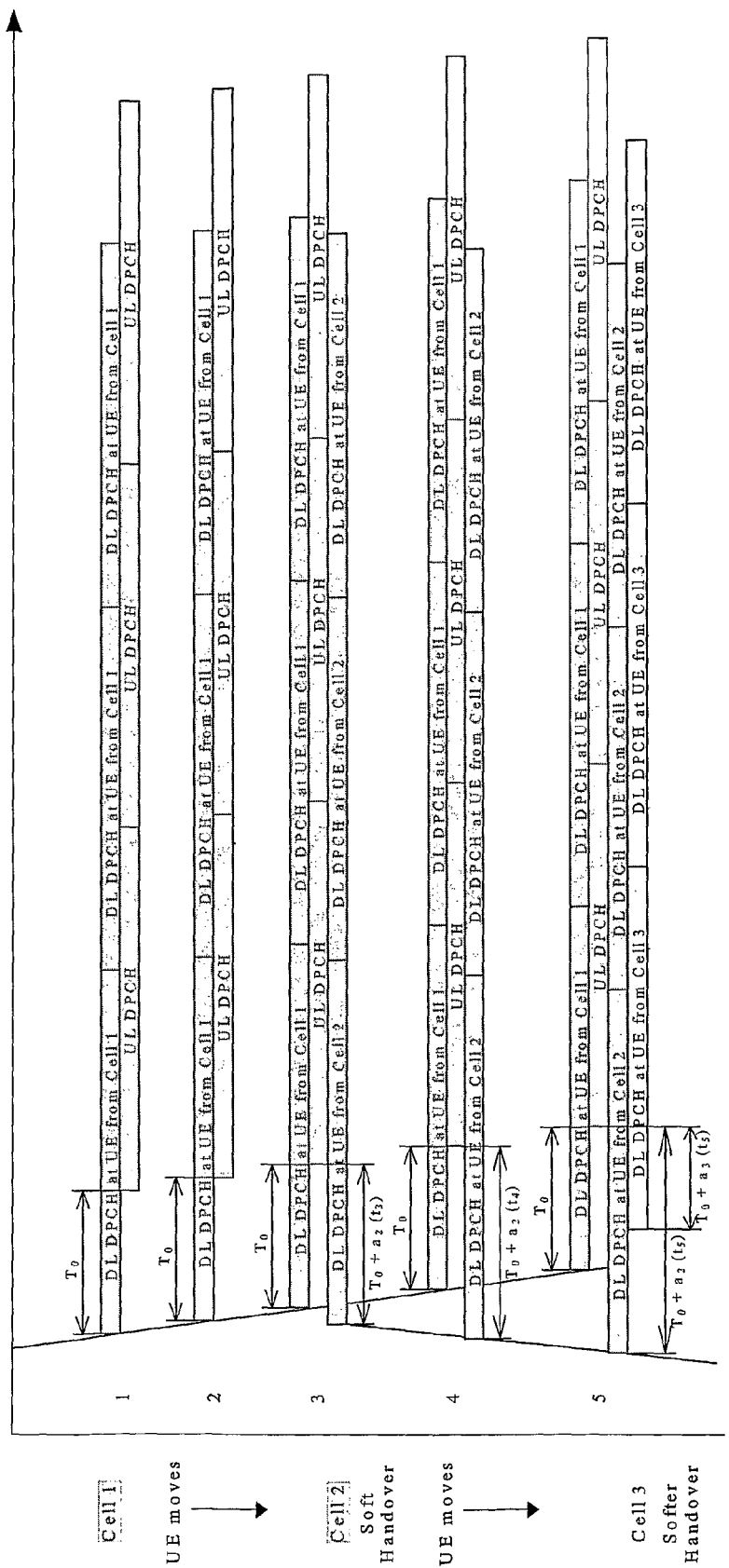
FIG. 3, already referred to, is a schematic diagram illustrating a first scenario with two radio-links transmitted non simultaneously from a single base station.
Figure 4:
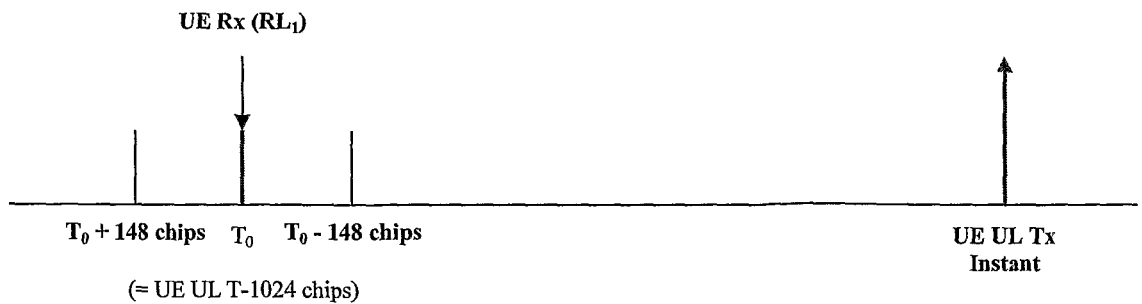
FIG. 4 to 9, already referred to, are schematic diagrams illustrating a second scenario with two radio-links transmitted non simultaneously from a single base station.
Figure 5:
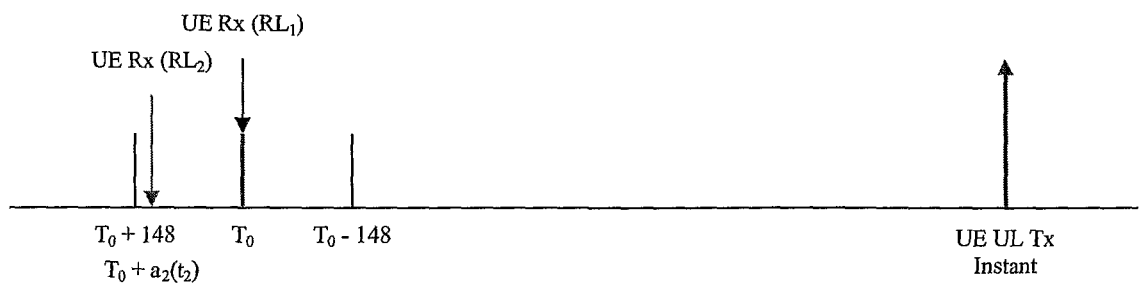
Figure 6:
Figure 7:
Figure 8:
Figure 9:
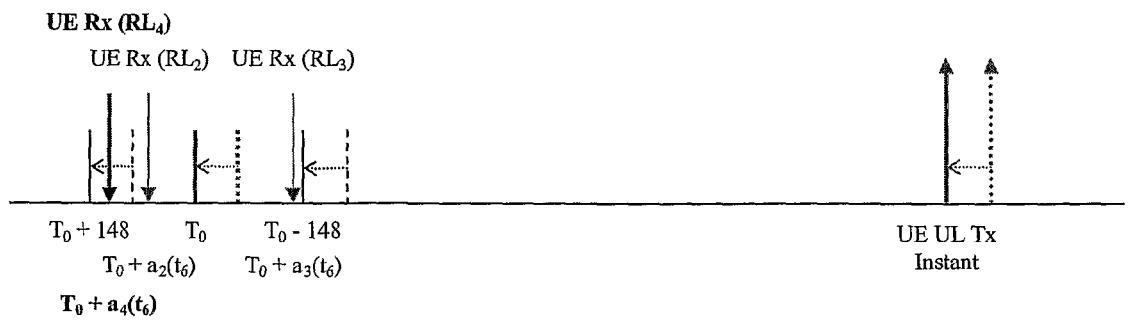
Figure 10:
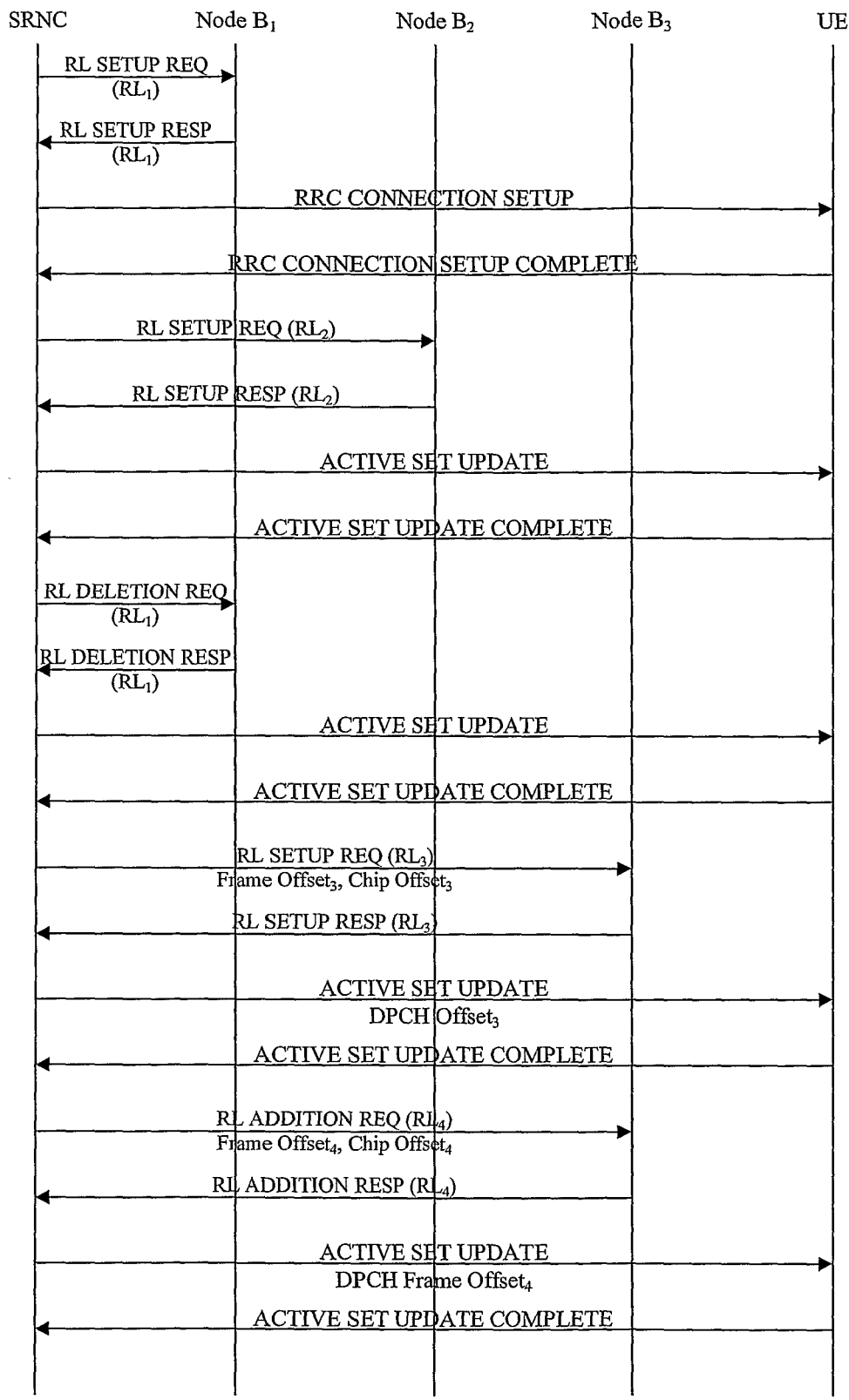
FIG. 10, already referred to, is a schematic diagram illustrating message flows between nodes for the above-mentioned second scenario.

In UMTS systems, the so-called "Frame Offset" parameter is a synchronisation parameter defined as a radio link specific L1 parameter used to map the CFN, used in the transport channel, into the SFN that defines the specific radio frame for the transmission on the air interface. In the UTRAN, the Frame Offset parameter is calculated by the SRNC and provided to the Node B. Likewise, the so-called "Chip Offset" parameter is used as offset for the DL DPCH relative to the P-CCPCH (Primary Common Control Physical Channel—see 3GPP TS 25.211) timing. The Chip Offset parameter is calculated by the SRNC and provided to the Node B. Both the Frame Offset and Chip Offset parameters values are sent to the Node-B via the NBAP protocol (see the technical specification 3β TS 25.433 v3.2.0 <<UTRAN Iub Interface NBAP Signaling (Release 1999)>> published in June 2000 by the 3GPP). This is illustrated on FIG. 10 on the radio link setup messages sent from the SRNC to the third base station (Node-$B_3$) which comprise "Frame Offset" and "Chip Offset" parameter values for the third ($RL_3$) and fourth ($RL_4$) radio links, respectively. These parameter values define transmission timings at the third base station (Node-$B_3$) for the corresponding radio link.

According to the preferred embodiment of the invention, the base station (Node-B3) determines whether predetermined conditions are met so that a substantially simultaneous transmission can be selected.

Such predetermined conditions can correspond to a case in which the base station is already transmitting a radio link in a cell for a UE, and receives from the SRNC a setup or addition request for an additional radio link, on the same cell and for the same UE. Such a case has been described previously (second scenario), and is illustrated by the addition request for the fourth radio link ($RL_4$) received by the third base station (Node-$B_3$) which has previously established a third radio link ($RL_3$) on the same cell ($Cell_3$) for a given UE. The second scenario illustrated the possibility that the SRNC sends to a base station transmission timing parameters for an additional radio link; that would lead to non substantially simultaneous transmission of a plurality of radio links, although those radio links are transmitted in the same cell, towards the same UE. In such a case the base station determines whether substantially simultaneous transmission can be selected, i.e. whether said transmission timing parameters sent for the additional radio link can be modified, so that substantially simultaneous transmission may be achieved. In UMTS systems, such modification will typically consist in a shift by a predetermined chip offset (typically 256 chips).

Such predetermined conditions can also correspond to a case in which the base station receives requests for transmission of a plurality of radio links in a so-called "softer handover" mode to a UE, that is requests for transmission of a plurality of radio links, each in one cell of the base station coverage, for a given UE. Here again, there is a possibility that the SRNC sends transmission timing parameters for the radio links to be established that would lead to non substantially simultaneous transmission of a plurality of radio links. In such a case the base station determines whether substantially simultaneous transmission can be selected, i.e. whether said transmission timing parameters sent for each RL in the plurality of radio links can be modified, so that substantially simultaneous transmission may be achieved. In UMTS systems, such modification will typically consist in a shift by a predetermined chip offset (typically 256 chips).

According to the invention, base station with substantially simultaneous transmission capabilities will select, responsive to said determination, such substantially simultaneous transmission.

A base station which implements the invention will comprise a transmission control module adapted for determining whether predetermined conditions are met so that a substantially simultaneous transmission can be selected, and for selecting, responsive to said determination, such substantially simultaneous transmission. This transmission control module will first determine whether some predetermined conditions are met. For instance, it will determine, as described above, upon reception from the SRNC of a setup or addition request for an additional radio link in a cell for a UE, whether the base station is already transmitting a radio link on the same cell and for the same UE. It will also detect, for instance, whenever the base station receives requests for transmission of a plurality of radio links in "softer handover" mode for a UE.

The transmission control module will then determine whether modification of the received transmission timing parameters so that substantially simultaneous transmission may occur is necessary or should be considered, and whether or not it is possible. In the preferred embodiment of the invention, such modification is selected whenever possible, resulting in selection of a substantially simultaneous transmission of the plurality of radio links.

The base station can therefore select a substantially simultaneous transmission which would affect the initially considered transmission timings of some new radio links for which it received setup/addition requests from the SRNC. It could then directly inform the UE of the modified transmission timings so that the UE may synchronize its reception timings. The following presents an example of alternative embodiment in the context of the UMTS system.

For the purpose of synchronisation at the UE side, a so-called "DPCH Frame Offset" parameter is used as offset for the DL DPCH relative to the PCCPCH timing at both the Node B and the UE. The DPCH Frame Offset is equivalent to Chip Offset rounded to the closest 256 chip boundary. It is calculated by the SRNC and sent to the UE by the SRNC for each radio link in the active set.

As the SRNC has to indicate the "DPCH Frame Offset" parameter value to the UE, the Node B should indicate to the SRNC, when this is the case, whether the transmission instant has been shifted by a chip offset (typically plus or minus 256 chips) in order to perform substantially simultaneous transmission as compared to the value that can be initially considered for the transmission instant positioning (i.e. the value deduced from the "Chip Offset" parameter value).

Figure 11:
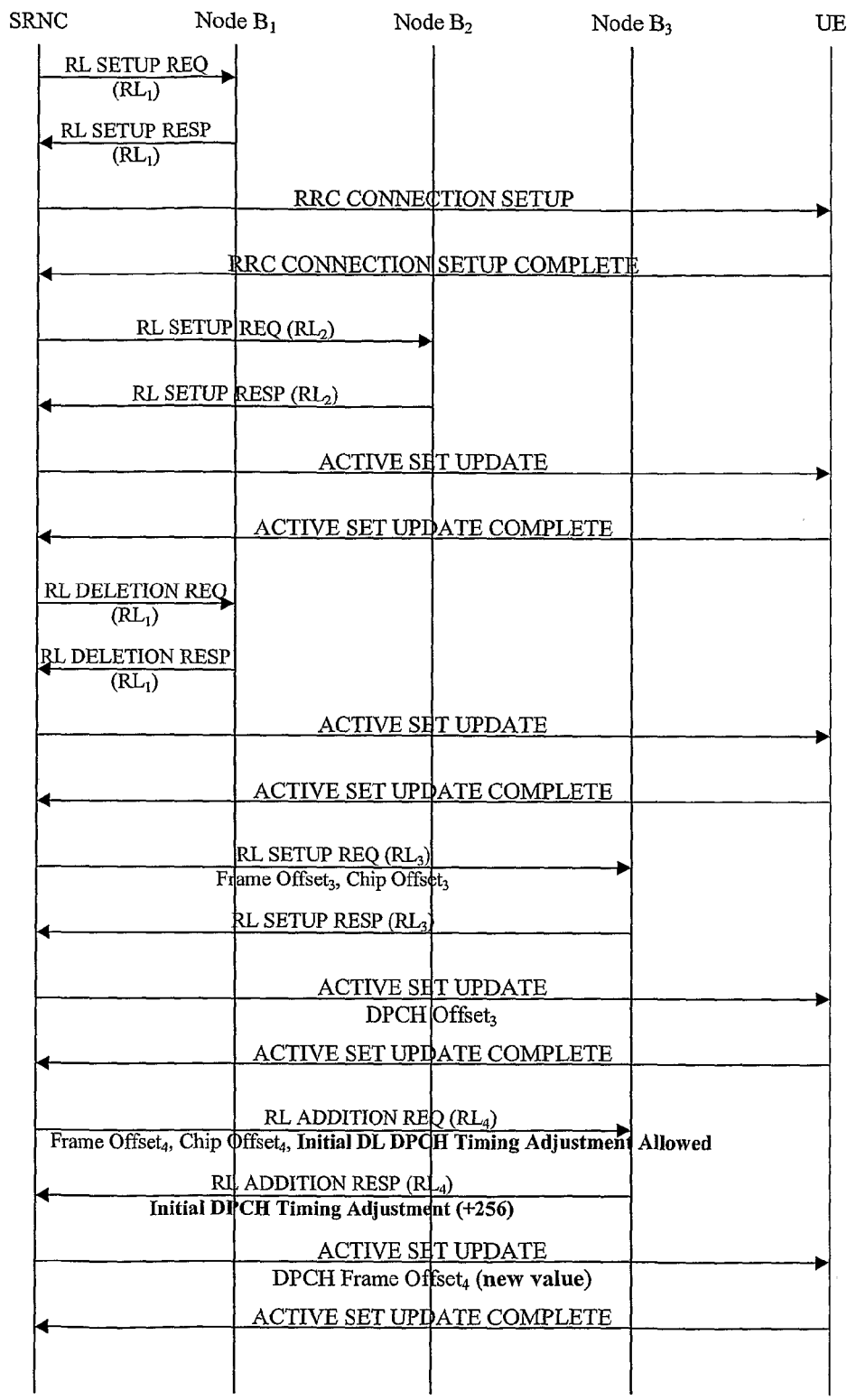
FIG. 11 is a schematic diagram illustrating message flows between nodes for the above-mentioned second scenario according to the invention.

This could be implemented through the introduction of a new, optional information element, for instance called "Initial DL DPCH Timing Adjustment", in, respectfully, the "RL Information Response" or "Unsuccessful RL Information Response" Information Elements of the RADIO LINK SETUP RESPONSE, the RADIO LINK SETUP FAILURE, the RADIO LINK ADDITION RESPONSE and/or the RADIO LINK ADDITION FAILURE as currently specified in the technical specification 3GPP TS 25.433, V6.4.0. Such new information element can for instance have the format ENUMERATED (−256 chips, +256 chips), as offered by the above-mentioned specification for a new IE. This new IE is illustrated on FIG. 11 in the RL-ADDITION-RESP NBAP message sent by the third base station (Node-B$_3$) to the SRNC with regard to the addition of the fourth radio link (RL$_4$).

In some cases, the SRNC will communicate with the base station through the DRNC through which the base station is linked through the Iur interface according to the so-called RNSAP protocol (see the technical specification 3GPP TS25.423, "UTRAN Iur Interface RNSAP Signalling (Release 6)", v 6.4.1 published in January 2005 by the 3GPP). According to the invention, it is proposed to also introduce the above-mentioned new, optional information element in, respectfully, the "RL Information Response" or "Unsuccessful RL Information Response" Information Elements of the RADIO LINK SETUP RESPONSE, the RADIO LINK SETUP FAILURE, the RADIO LINK ADDITION RESPONSE and/or the RADIO LINK ADDITION FAILURE as currently specified in the technical specification 3GPP TS 25.423, V6.4.1.

Furthermore, as the SRNC should adapt the "DPCH Frame Offset" parameter value sent to the UE based on the feedback provided by the Node B, the SRNC should also provide an indication to the Node B that it is capable to do so. Therefore, according to a further embodiment of the invention, the SRNC indicates in its requests for a setup or addition of a new radio link whether or not substantially simultaneous transmission can be selected. For instance, it will indicates in its requests for a setup or addition of a new radio link whether or not modification of the transmission timing parameters comprised in the radio link setup/addition request is allowed.

According to one embodiment of the invention, it is proposed to introduce a new, optional information element, for instance called "Initial DL DPCH Timing Adjustment Allowed", in the RADIO LINK SETUP REQUEST, RADIO LINK ADDITION REQUEST NBAP and RNSAP messages. This new "Initial DL DPCH Timing Adjustment Allowed" information element can simply be designed as a flag (for instance a simple bit). This new IE is illustrated on FIG. 11 in the RL-ADDITION-REQ NBAP message sent by the SRNC to the third base station (Node-B$_3$) with regard to the addition of the fourth radio link (RL$_4$).

Upon receipt from the Node B of information that the transmission instant has been shifted by a chip offset in order to perform substantially simultaneous transmission, the SRNC provides the modified transmission timing information to the UE. This is illustrated on FIG. 11 by the active set update ACTIVE SET UPDATE message sent from the SRNC to the UE with regard to the addition of the fourth radio link (RL$_4$), with the new value for the DPCH Frame Offset parameter.

In an alternative embodiment, the SRNC may select transmission timings so that substantially simultaneous transmission may occur whenever possible, that is may be preferred over non substantially simultaneous transmission. The selected transmission timings may then be communicated to the base station and the terminal.

The invention claimed is:

1. A method for controlling the transmission timing of a radio link on an air interface between a radio terminal and a radio access node, in a radio access node adapted to transmit a plurality of radio links to a radio terminal with substantially simultaneous transmission timings, the process comprising the steps of:

receiving a request for transmission of a first radio link to the radio terminal with transmission timing parameters that would lead to non substantially simultaneous transmission of the first radio link with respect to a second radio link to the radio terminal, wherein such request contains an indication as to whether or not substantially simultaneous transmission can be selected;

determining whether predetermined conditions are met so that a substantially simultaneous transmission of the first and second radio links to said radio terminal can be selected; and responsive to said determination, selecting transmission timing parameters for transmission of the first radio link so that substantially simultaneous transmission of said first and second radio links is achieved.

2. A method according to claim 1, further comprising the step of informing the radio terminal that the transmission of said first and second radio links will be substantially simultaneous.

3. A method according to claim 1, further comprising the step of
informing a radio access node controller that substantially simultaneous transmission of said first and second radio links is selected.

4. A method according to claim 1, in a wireless cellular radio access node which serves a plurality of radio cells, wherein the step of determining whether predetermined conditions are met includes the step of
determining whether said first and second radio links are in the process of being established for transmission to the radio terminal in a first cell and second cell, respectively.

5. A method according to claim 1, further comprising the steps of, in a radio access node controller,
communicating to the radio access node transmission timing information for the second radio link; and
receiving from the radio access node information that a substantially simultaneous transmission of said first and second radio links is selected.

6. A method according to claim 5, further comprising the step of transmitting to the radio terminal information that a substantially simultaneous transmission of said first and second radio links is selected.

7. A method according to claim 5 wherein the radio access node controller is a UMTS Radio Network Controller.

8. A method according to claim 1 wherein the radio access node is a UMTS Node-B.

9. A computer readable medium having processor executable instructions thereon for implementation by a processor, the instructions executing a method according to claim 1.

10. A radio access node adapted to transmit a plurality of radio links to a radio terminal on an air interface with substantially simultaneous transmission timings by controlling the transmission timing of the radio links, including a) receiving a request for transmission of a first radio link to the radio terminal with transmission timing parameters that would lead to non substantially simultaneous transmission of the first radio link with respect to a second radio link to the radio terminal, wherein such request contains an indication as to whether or not substantially simultaneous transmission can be selected, b) determining whether predetermined conditions are met so that a substantially simultaneous transmission of the first and second radio links to the radio terminal can be selected and c) in response to the determining, selectin transmission timing parameters for transmission of the first radio link so that substantially simultaneous transmission of the first and second radio links is achieved.

11. The radio access node according to claim 10, the radio access node comprising a UMTS Node-B.

12. A wireless system for controlling the transmission timing of a radio link on an air interface between a radio terminal and a radio access node, comprising
a radio access node adapted to transmit a plurality of radio links to a radio terminal with substantially simultaneous transmission timings, said radio access node controlling the transmission timing of a radio link on an air interface between a radio terminal and said radio access node by determining whether predetermined conditions are met so that a substantially simultaneous transmission of a first and second radio links to said radio terminal can be selected; and, responsive to said determination, selecting a substantially simultaneous transmission of said first and second radio links,
said wireless system further including
a radio access node controller for communicating transmission timing information for the second radio link to the radio access node and receiving information from the radio access node that a substantially simultaneous transmission of the first and second radio links is selected.

13. The wireless system according to claim 12, the radio access node controller comprising a UMTS Radio Network Controller.

14. The wireless system according to claim 12, the radio access node comprising a UMTS Node-B.

15. A method for controlling the transmission timing of a radio link on an air interface between a radio terminal and a radio access node, in a radio access node adapted to transmit a plurality of radio links to a radio terminal with substantially simultaneous transmission timings, the method comprising:
a) in a wireless cellular radio access node that serves a plurality of radio cells, determining predetermined conditions are met so that a substantially simultaneous transmission of first and second radio links to the radio terminal can be selected, including determining the first radio link is being transmitted to the radio terminal in a first cell with a first transmission timing and whether establishment of the second radio link for transmission to the radio terminal in the first cell has been requested; and
b) in response to the determining in a), selecting a substantially simultaneous transmission of the first and second radio links.

16. The method according to claim 15, further comprising:
c) transmitting the first radio link to the radio terminal, the first radio link being transmitted with a first transmission timing; and
d) selecting a transmission timing for the second radio link so that the transmission of the first and second radio links is substantially simultaneous.

17. A method for controlling the transmission timing of a radio link on an air interface between a radio terminal and a radio access node, in a radio access node adapted to transmit a plurality of radio links to a radio terminal with substantially simultaneous transmission timings, the method comprising:
a) determining predetermined conditions are met so that a substantially simultaneous transmission of first and second radio links to the radio terminal can be selected; and
b) in response to the determining in a), selecting a substantially simultaneous transmission of the first and second radio links;
c) transmitting the first radio link to the radio terminal, the first radio link being transmitted with a first transmission timing; and
d) selecting a transmission timing for the second radio link so that the transmission of the first and second radio links is substantially simultaneous.

18. A method according to claim 17, in which the step of informing the radio terminal that the transmission of said first and second radio links will be substantially simultaneous comprises a step of
communicating to the terminal said selected transmission timing.

19. A method for controlling the transmission timing of a radio link on an air interface between a radio terminal and a radio access node, in a radio access node adapted to transmit a plurality of radio links to a radio terminal with substantially simultaneous transmission timings, the method comprising:
  a) determining predetermined conditions are met so that a substantially simultaneous transmission of first and second radio links to the radio terminal can be selected;
  b) in response to the determining in a), selecting a substantially simultaneous transmission of the first and second radio links;
  c) in a radio access node controller, communicating to the radio access node transmission timing information for the second radio link; and
  d) receiving information from the radio access node that a substantially simultaneous transmission of the first and second radio links is selected, the information including transmission timing information for the second radio link.

20. A method according to claim 19, comprising a step of transmitting to the radio terminal said transmission timing information for said second radio link received from the radio access node.

* * * * *